(12) United States Patent
Reitter

(10) Patent No.: US 6,633,228 B1
(45) Date of Patent: Oct. 14, 2003

(54) COMMUNICATION SYSTEM FOR SIMULTANEOUS TWO-CHANNEL TRANSMISSION OF DATA BETWEEN SUBSCRIBERS

(75) Inventor: Josef Reitter, Moehrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/510,729

(22) Filed: Feb. 22, 2000

(30) Foreign Application Priority Data

Feb. 22, 1999 (DE) .......................... 199 07 538

(51) Int. Cl.[7] .......................................... H04M 11/04
(52) U.S. Cl. ........................ 340/310.01; 340/310.02; 340/310.03; 340/310.06; 340/310.07; 375/259; 455/3.3
(58) Field of Search .................. 340/310.01, 310.03, 340/310.07, 310.02, 310.06; 375/259; 455/3.3

(56) References Cited

U.S. PATENT DOCUMENTS 5,559,377 A * 9/1996 Abraham ................... 307/104
5,796,604 A * 8/1998 Le Van Suu ................... 700/3
5,952,914 A * 9/1999 Wynn ..................... 340/310.01
6,040,759 A * 3/2000 Sanderson ............. 340/310.01
6,297,729 B1 * 10/2001 Abali et al. ............ 340/310.01

FOREIGN PATENT DOCUMENTS

| CA | 2 037 557 | 9/1991 |
| DE | 40 08 023 | 9/1991 |
| DE | 41 38 065 | 5/1993 |
| DE | 195 04 587 | 8/1996 |
| DE | 195 44 027 | 1/1999 |

* cited by examiner

Primary Examiner—Daniel J. Wu
Assistant Examiner—Tai T. Nguyen
(74) Attorney, Agent, or Firm—Schiff Hardin & Waite

(57) ABSTRACT

A communication system having at least two communication subscribers unidirectionally or bidirectionally exchanging data that are electrically connected to one another via at least one network cable which is in turn, connectible to a network termination via which energy can be supplied to the communication subscribers and via which an at least two-channel transmission of data in the form of electrical signals can occur at the same time from a first to a second communication subscriber.

20 Claims, 2 Drawing Sheets

COMMUNICATION SYSTEM FOR SIMULTANEOUS TWO-CHANNEL TRANSMISSION OF DATA BETWEEN SUBSCRIBERS

BACKGROUND OF THE INVENTION

1. Field of the Invention

The present invention is directed to a communication system having at least two communication subscribers exchanging data unidirectionally or bidirectionally.

2. Description of the Prior Art

The communication subscribers of such known communication systems are electrical devices that are respectively connected via network lines to a network termination for energy supply of the devices. The exchange of data between the communication subscribers usually occurs via separately implemented data and control lines that connect the individual devices of the communication system to one another. However, the devices also can be connected to a communication bus that connects the devices to one another.

Known are devices for internal house voice and data communication between at least two pieces of communication terminal equipment via a separate house power supply network. Energy is supplied to the communication terminal equipment via the power supply network, and an at least two-channel communication between the communication terminal equipment can simultaneously occur via the power supply network, wherein each piece of the communication terminal equipment always receives data via one of the two channels connecting the communication terminal equipment to one another and sends data via the other of the two channels.

DE 195 44 027 C2 discloses a bus system with bus subscribers that includes controls for communication with at least one other bus subscriber. A three-lead network cable is provided for connecting the bus subscribers to one another, as a result whereof the outlay for the cabling between the bus subscribers is reduced. However, a four-lead network cable is preferred, wherein the additional protective conductor serves as bus line. A single-channel communication between two bus subscribers connected to the bus line respectively occurs via the bus line.

DE 195 04 587 A1 also discloses a two-way communication system for energy supply networks for data transmission between a central device in the routing level of an electrical energy supply network and consumer devices.

The present invention is based on the object of implementing a communication system of the species initially cited such that the outlay for the connection of the communication subscribers for data exchange with one another is reduced, and such that the communication system is suitable for the transmission of data for triggering security-relevant functions at a communication subscriber.

SUMMARY OF THE INVENTION

This object is achieved by a communication system which include at least two communication subscribers unidirectionally or bidirectionally exchanging data with one another that are electrically connected to one another via at least one network cable which is, in turn, connectible to a terminal via which energy can be supplied to the communication subscribers and via which an at least two-channel transmission of data in the form of electrical signals occurs at the same time from a first to a second communication subscriber, wherein the communication subscribers include devices for generating signals to be transmitted via the network cable and/or for the interpretation of signals transmitted via the network cable. In the inventive communication system, thus, separately implemented data and control lines connecting the communication subscribers to one another for data exchange or, respectively, a separately implemented communication bus in the form of one or more bus lines to which the communication subscribers are connected is foregone.

On the contrary, a network cable that every communication subscriber already has for energy supply is also utilized for the transmission of data. In this way, the outlay for the connection of the communication subscribers of the communication system to one another is clearly reduced, since each communication subscriber that is to be accepted into the communication network only has to be connected to the network cable in order to be supplied with energy and in order to be able to exchange data with other communication subscribers. Here, too, the outlay for the preparation of a room in which a number of communication subscribers are intended to form such a communication system is advantageously reduced by the present invention since laying separate data and control lines or, respectively, bus lines of a separately implemented communication bus can be foregone.

A particular advantage of the present invention lies in the at least two-channel transmission of data via the network cable. The possibility of successive or simultaneous transmission of data via two separate transmission routes independent of one another in one of two selectable directions from one to another communication subscriber is particularly advantageous when triggering security-relevant functions at one of the communication subscribers, since such a triggering can be made dependent thereon that corresponding information is communicated to the corresponding communication subscribers via both transmission channels decoupled from one another. By way of example, let the triggering of x-radiation at an x-ray apparatus be cited.

One embodiment of the present invention provides that the network cable is an at least three-lead, shielded network cable connectible to a single-phase network terminal having a conductor, a zero conductor and a protective conductor. The shielded network cable enhances the security in the transmission of data, wherein the shielding reduces the superimposition of noise signals.

According to one version of the present invention, the conductor and the zero conductor form a first transmission channel via which a symmetrical transmission of data occurs, preferably with a high data rate. The carrier signal is thereby modulated with signals containing data upon transmission, wherein the modulated carrier signal is transmitted via the conductor and the zero conductor separately in the form of two signals. Upon reception, a difference signal to be demodulated and corresponding to the modulated carrier signal is acquired from the signals transmitted via the conductor and the zero conductor. The symmetrical transmission of data is distinguished by low susceptibility to disturbance since, after reception, a difference signal is acquired from the signals transmitted via the conductor and the zero conductor; the noise signals acting identically on the signals transmitted via the conductor as well as via the zero conductor being eliminated therefrom by the formation of the difference. The screened difference signal thereby corresponds to the modulated carrier signal that is to be demodulated for the recovery of the signals containing the data. The symmetrical transmission is preferably suitable for transmission of data with high data rates.

DE 41 38 065 A1, moreover, discloses a system for transmitting data and energy via a three-lead cable to which a number of subscribers are respectively connected with a transmission and reception unit, wherein the data transmission between the subscribers occurs with symmetrical signals on two of the three leads. A power supply unit for the subscribers which supplies a feed current onto the two leads of the cable in roughly equal parts is also connected to the cable.

According to another embodiment of the present invention, the protective conductor represents a second transmission channel in and of itself via which an asymmetrical transmission of data having, preferably, a low data rate occurs. The second transmission channel is decoupled from the first transmission channel and preferably serves as control line when triggering security-relevant functions of a communication subscriber. The carrier signal is modulated with signals containing data upon transmission and the modulated carrier signal is demodulated upon reception. The protection against noise signals derives with the cable shielding at the network in the case of the protective conductor.

According to another embodiment of the present invention, the network cable is an at least five-lead, shielded network cable connectible to a three-phase terminal having three conductors, a zero conductor and a protective conductor. The first and second conductor of the three conductors thereby form a first transmission channel, and the third of the three conductors and the zero conductor form a second transmission channel via which a symmetrical transmission of data respectively occurs, preferably with a high data rate. This provides that a carrier signal is respectively modulated with signals containing data upon transmission per transmission channel, the modulated carrier signal being separately transmitted via the two conductors of the respective transmission channel in the form of two signals. Upon reception, a difference signal to be demodulated and corresponding to the respectively modulated carrier signal is acquired via the signals transmitted over the two conductors of the respective transmission channel. In this way, a two-channel, symmetrical transmission of data is enabled, as a result whereof the amount of data transmittable between the two communication subscribers per time unit is clearly increased.

According to a further embodiment of the present invention, the protective conductor forms a third transmission channel via which an asymmetrical transmission of data occurs, preferably with a low data rate. The carrier signal is modulated with signals containing data upon transmission or, respectively, the modulated carrier signal is demodulated upon reception. In this way, a three-way channel transmission of data can be achieved with a five-lead, shielded network cable.

Additional embodiments contemplate that the data rates given symmetrical transmission preferably lie between the processor 1 through 100 Mbits/s, and the data rates given asymmetrical transmission preferably lie between approximately 9 and 200 kBit/s. The data rates for the symmetrical and the asymmetrical transmission, however, also can lie outside these ranges. The length of the transmission channel, i.e. the length of the network cable between the communication subscribers, can thereby amount to 100 m and more dependent on the type of network cable employed and the data rates to be transmitted.

Pursuant to another embodiment of the present invention, the device for generating and/or interpreting signals includes a filter circuit, at least one transformer [or: repeater] and a circuit for modulation of carrier signals with signals containing data or, respectively, for demodulation of modulated carrier signals. The filter circuit, which is preferably a passive LC filter, effects a separation of circuits upon transmission and reception of signals. The transformer serves the purpose of coupling the carrier signals modulated with signals containing data onto or, respectively, out of the conductors.

According to preferred embodiments of the present invention, the communication system includes a number of medical apparatus or components of a medical apparatus that form a medical work station. The inventive communication of the communication subscribers via the network cable thereby reduces the outlay required for the cabling of the medical apparatus to one another for data exchange to a considerable extent and also satisfies the demands made of security-critical apparatus in view of the triggering of security-relevant functions as a result of the at least two-channel transmission of data.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
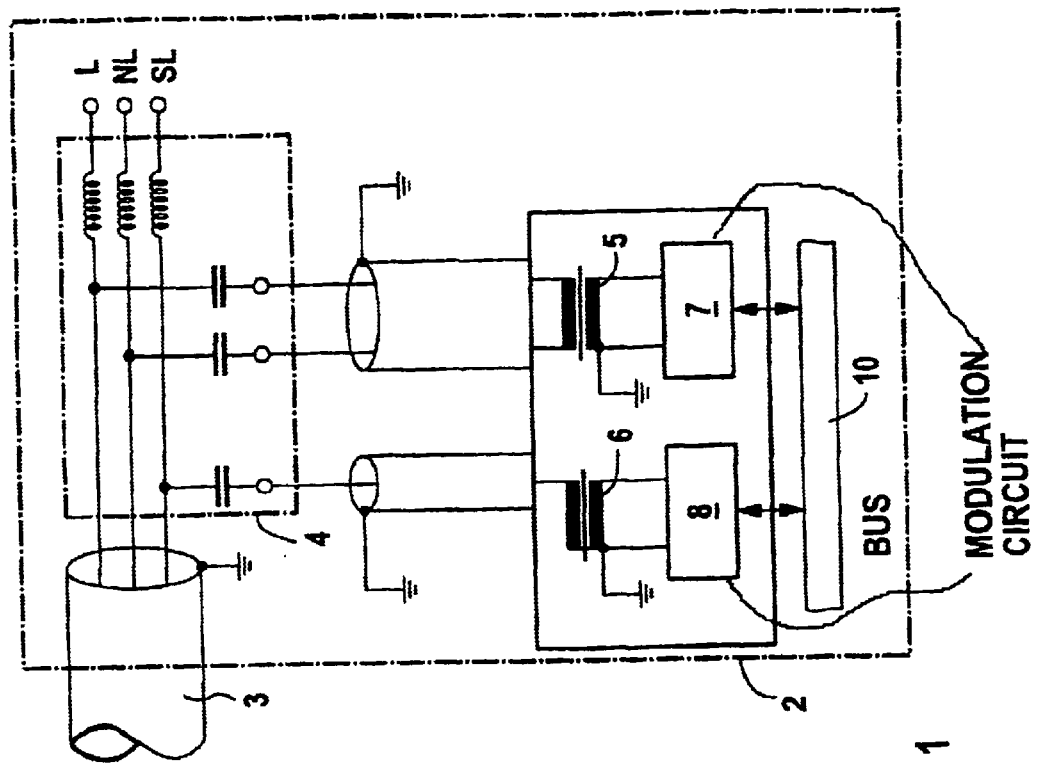
FIG. 1 shows a two-channel transmission of data via a three-lead network cable between two communication subscribers in accordance with the teachings of the present invention.
Figure 1:
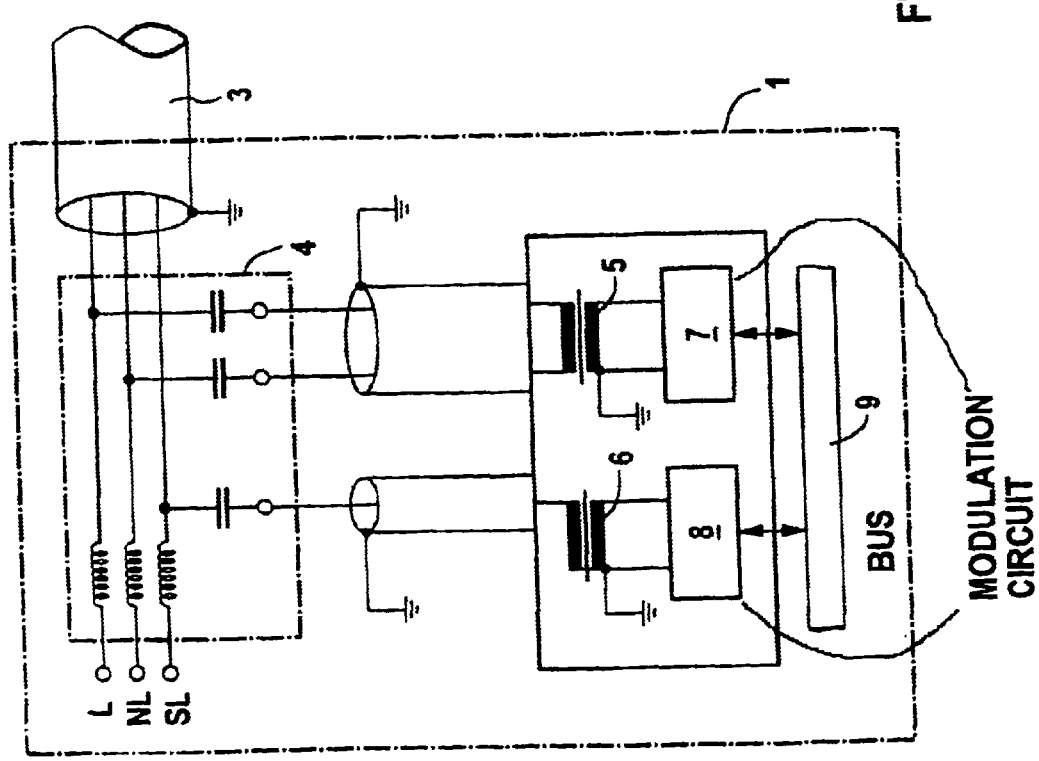

In a schematic illustration, FIG. 1 shows two communication subscribers of a communication system in the form of two apparatus 1 and 2. The apparatus 1, 2 are shown and explained only to the extent required for an understanding of the present invention.

In the case of the present exemplary embodiment, the apparatus 1, 2 are connected to one another via a three-lead network cable 3 that is shielded for EMC reasons and connected to a single-phase network termination (not shown in FIG. 1). The network cable 3 includes a conductor L, a zero conductor NL and a protective conductor SL. The network cable 3 serves both for supplying the apparatus 1, 2 with energy as well as for the transmission of data between the apparatus 1, 2, whereby a two-channel transmission of data is inventively possible via the network cable 3 between the apparatus 1, 2. In the case of the present exemplary embodiment, the conduct L and the zero conductor NL form a first transmission channel for the symmetrical transmission of data, and the protective conductor SL by itself forms a second transmission channel decoupled from the first for the asymmetrical transmission of data.

For the symmetrical and asymmetrical transmission of data via the network cable 3, the apparatus 1, 2 in the case of the present exemplary embodiment have substantially structurally and functionally identical devices available to them for generating signals to be transmitted via the network cable 3 and for the interpretation of signals transmitted via the network cable 3. The devices include an LC filter 4, transformers 5, 6 and circuit 7, 8 for the modulation of carrier signals with signals containing data, referred to below as data signals or, respectively, for demodulation of carrier signals for recovering the data signals.

When, for example, the apparatus 1 sends data to the apparatus 2, these are transmitted to the circuits 7 or, respectively, 8 of the apparatus 1 via an internal communication bus 9 of the apparatus 1 in the form of data signals. Given symmetrical transmission of the data, a carrier signal is, for example, frequency-modulated with the data signals with the circuit 7. The modulated carrier signal subsequently is supplied onto the conductor L and the zero conductor NL with the transformer 5 and the LC filter 4 and, simultaneously, is symmetrically transmitted to the apparatus 2 split into two signals via the conductor L and the zero conductor NL. At the side of the apparatus 2, the LC filter 4 effects a separation of the signals from the energy simultaneously transmitted to the apparatus 1, 2 via the network cable 3. With the transformer 5 at the side of the apparatus 2, a difference signal is acquired from the signals transmitted symmetrically via the conductor L and the zero conductor NL, this difference signal substantially corresponding to the original, modulated carrier signal. This difference signal is subsequently demodulated with the circuit 7 so that the data signals for the apparatus 2 are available for further processing and can be communicated to corresponding components of the apparatus 2 via the internal communication bus 10 of the apparatus 2.

The advantage of the symmetrical transmission is that noise signals potentially influencing the transmission path identically influence the signal transmitted via the conductor L and the signal transmitted via the zero conductor NL. By forming the difference, i.e. forming a difference signal from the signals transmitted via the conductor L and the zero conductor NL, the noise signals are, in turn, eliminated. The noise sensitivity of the symmetrical transmission, accordingly, is comparatively slight.

In the asymmetrical transmission of data via the protective conductor SL, a carrier signal is modulated with data signals with the circuit 8 upon transmission, is coupled onto the protective conductor SL with the transformer 6 and the LC filter 4, and is transmitted via the protective conductor SL; for example, from the apparatus 1 to the apparatus 2. Upon reception of the modulated carrier signal, the LC filter 4 at the side of the apparatus 2 effects a separation between the energy provided for the apparatus 2 and the modulated carrier signal, which is coupled out with the assistance of the transformer 6 at the side of the apparatus 2 and is demodulated with the circuit 8 for the recovery of the data signals. The data is subsequently available to the apparatus 2 for further processing. Since the data rate in the asymmetrical transmission is usually lower than in the symmetrical transmission of data, the shielding of the network cable 3 usually suffices for anti-interference dependability.

The data rate for the symmetrical transmission preferably amounts to approximately 1 through 100 Mbits/s and preferably amounts to approximately 9 through 200 kbits/s for the asymmetrical transmission. The data rates for the symmetrical and the asymmetrical transmission, however, also can lie outside these ranges. The maximum transmission rate of 100 Mbits/s for the symmetrical transmission preferably is achieved by employing network cables suitable for high-frequency, these being specifically shielded. The length of the transmission path can thereby amount to 100 m and be more dependent on the data rates to be transmitted.

As a result of the higher anti-interference dependability and the higher band width for the transmission of data, the first transmission channel preferably is provided for the transmission of greater amounts of data. The second transmission channel preferably serves as a type of control line; for example, for triggering security-relevant functions such as x-radiation at an x-ray apparatus. For the cited example, x-radiation only can be triggered, practically speaking when corresponding signals are transmitted or have been transmitted via both transmission channels, for example from a control unit to the x-ray apparatus. The triggering of a function or, respectively, of an event thus can be linked to meeting two conditions with the two-channel transmission, this corresponding to a logical AND operation.

The symmetrical and asymmetrical transmission of data via the network cable 3 can occur both simultaneously as well as in alternation with one another. Moreover, a separate carrier signal need not necessarily be generated for the data signals; rather, the 50 Hertz energy signal can also be employed as carrier signal.

The values of the components of the LC filter are to be dimensioned in conformity with the carrier signal employed. The carrier signal can be modulated in various ways, whereby frequency modulation or pulse-width modulation are preferred.

The invention was explained above with reference to the example of a three-lead network cable 3 that is connectible to a single-phase network terminal. The multi-channel transmission of data via a network cable, however, also is possible via more than a three-lead network cable. Thus, for example, a three-channel transmission of data can occur in the same way as described for the three-lead network cable 3 via a five-lead network cable having three conductors, a zero conductor and a protective conductor that is connectible to a three-phase network termination.

In this exemplary embodiment of the present invention, two of the three conductors of the five-lead network cable form a first transmission channel, and the third of the three conductors and the zero conductor form a second transmission channel for the symmetrical transmission of data. As such, the transmission of data occurs decoupled from one another in the same way via each of the two transmission channels and with the same devices as in the case of the exemplary embodiment for the first transmission channel described in FIG. 1.

The protective conductor of the five-lead network cable, like the protective conductor of the three-lead network cable, forms an independent transmission channel. In the case of the five-lead network cable, the protective conductor represents a third transmission channel decoupled from the first two transmission channels for the asymmetrical transmission of data that occurs in the same way as via the protective conductor SL of the three-lead network cable 3.

Figure 2:
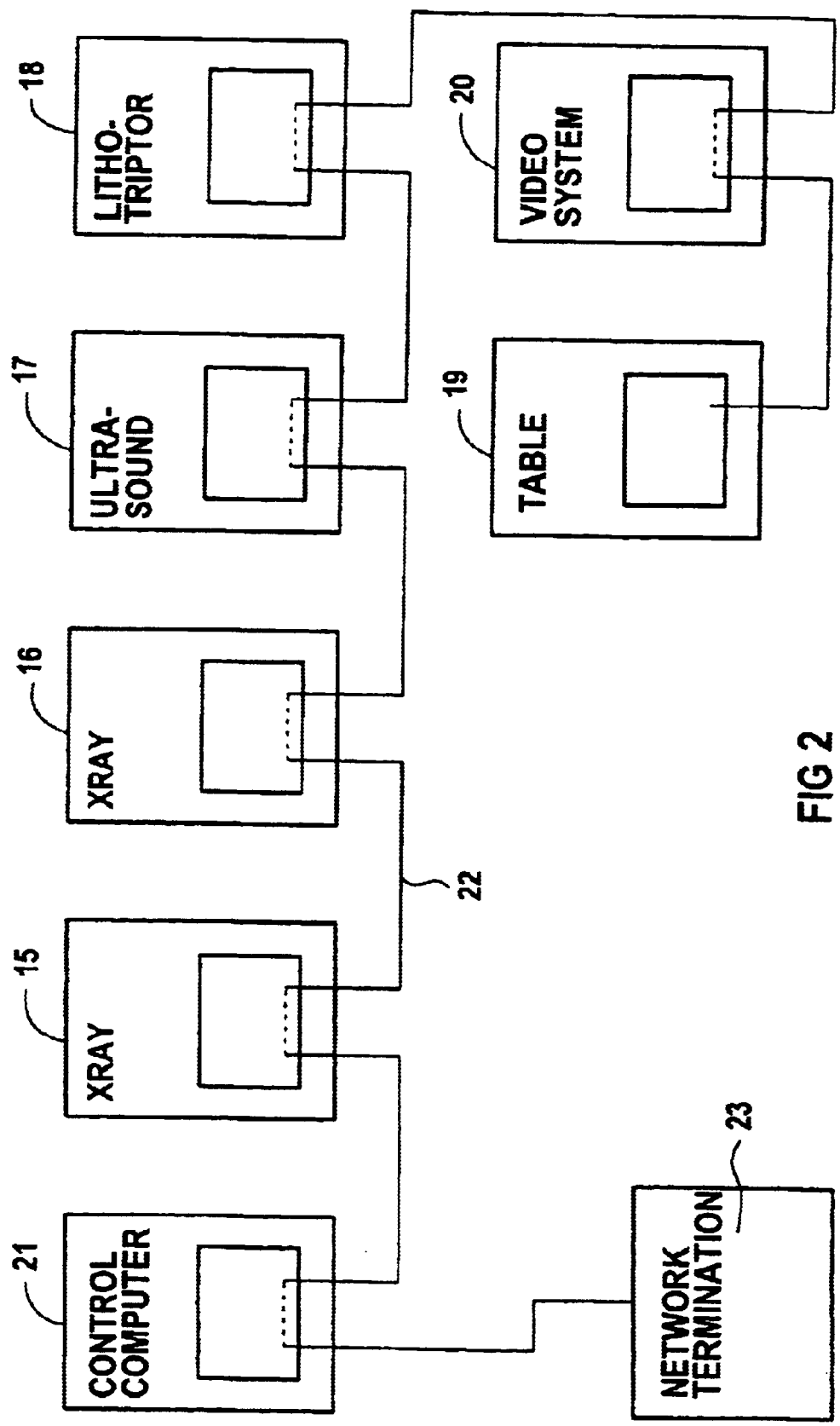
FIG. 2 shows a communication system of the present invention which includes a number of medical apparatus that are electrically connected to one another via a network cable.

FIG. 2 shows a communication system with seven communication subscribers. In the case of the present exemplary embodiment, the communication subscribers are a matter of medical apparatus 15 through 20 which together with a control computer 21 form a medical work station. The medical apparatus in the form of two x-ray apparatus 15, 16, an ultrasound apparatus 17, a lithotriptor 18, a patient bearing table 19 and a video system 20 for graphic presentation of the diagnostic image information acquired with the x-ray apparatus 15, 16 or, respectively, the ultrasound apparatus 17 are connected to the control computer 21 via a three-lead network cable 22 connected to a single-phase network termination 23. In the present exemplary embodiment, the control computer assumes the master function and controls the medical apparatus 15 through 20 according to the prescriptions of the medical personnel working at the medical work sation.

The medical apparatus 15 through 20 as well as the control computer 21 are supplied with energy from the energy connection 23 via the network cable 22. The communication between the control computer 21 and the medical apparatus 15 through 20 as well as the communication of the medical apparatus 15 through 20 with one another likewise occurs via the network cable 22 in the way set forth above. For example, data or control signals can be transmitted via an network cable 22 to the x-ray apparatus 15, 16, for example for acquiring x-ray images, to the ultrasound apparatus 17 for the acquisition of ultrasound images, to the lithotriptor 18 for triggering shock waves, to the patient bearing table 19 for the adjustment thereof or to the video system 20 for graphic presentation of the image information acquired with the x-ray apparatus 15, 16 or the ultrasound apparatus 17. The network cable 22 thereby fulfills the function of a bus cable.

The communication protocol for the transmission of data is thereby to be selected according to the respective demands made of the communication system. As regards the operation of the communication system, a central control of the communication can thus occurs with the control computer 21 in the present exemplary embodiment. However, a central control computer that assumes the master function need not necessarily be present. On the contrary, the control also can occur decentralized, i.e. each apparatus or each component has its own intelligence, for example in the form of a control unit, and independently communicates with other apparatus or components. In such a configuration, the communication subscriber 21 from FIG. 2 could be a matter of a central control panel instead of a control computer, a number of apparatus with their own intelligence being capable of being operated therefrom.

The network cable as bus cable also allows different configurations of the communication system; for example, a star-shaped configuration or a token ring configuration of the communication system.

Instead of the single-phase network termination, a three-phase network termination also can be present in the communication system shown in FIG. 2, wherein the apparatus are connected to the network termination or, respectively, to one another via a five-lead network cable in this case. As in the way set forth above, the three-channel transmission of data between the control computer and the medical apparatus or, respectively, between the medical apparatus with one another would be possible in this embodiment of the present invention.

The exemplary embodiment for a communication system shown in FIG. 2 is to be understood as being only by way of example. That is, other apparatus that need not necessarily be medical apparatus or components of a medical or non-medical system can be connected to one another via a network cable via which the apparatus or, respectively, components are supplied with energy and via which an at least two-channel transmission of data simultaneously occurs.

The communication system thereby also can have a number of network cables available to it that supply the communication subscribers with energy and via which data is transmitted between the communication subscribers.

Although the present invention has been described with reference to specific embodiments, those of skill in the art will recognize that changes may be made thereto without departing from the spirit and scope of the invention as set forth in the hereafter appended claims.

I claim as my invention:

1. A communication system comprising:
   at least first and second communication subscribers, each communication subscriber respectively including means for generating signals to be transmitted and means for interpreting signals received; and
   at least one network cable electrically connected between the first and second communication subscribers via which an at least two-channel bidirectional transmission of the data in the form of electrical signals simultaneously occurs between the first and second communication subscribers, the at least one network cable further connected to a network termination via which the first and second communication subscribers can be supplied with energy; wherein
      the network cable is an at least three-lead, shielded network cable including a conductor, a zero conductor and a protective conductor, the conductor and the zero conductor forming a first transmission channel, and the protective conductor forming a second transmission channel; and
      the network termination is a single-phase network termination.

2. A communication system as claimed in claim 1, wherein the conductor and the zero conductor form a first transmission channel via which a symmetrical transmission of data occurs.

3. A communication system as claimed in claim 2, wherein, upon transmission, a carrier signal is modulated with signals containing data, the modulated carrier signal being separately transmitted via the conductor and the zero conductor in the form of two signals.

4. A communication system as claimed in claim 3, wherein, upon reception, a difference signal to be demodulated and which corresponds to the modulated carrier signal is acquired from the signals transmitted via the conductor and the zero conductor.

5. A communication system as claimed in claim 2, wherein a data rate in the symmetrical transmission is approximately 1 through 100 Mbits/s.

6. A communication system as claimed in claim 1, wherein the protective conductor forms a second transmission channel via which an asymmetrical transmission of data occurs.

7. A communication system as claimed in claim 6, wherein upon transmission, a carrier signal is modulated with signals containing data.

8. A communication system as claimed in claim 7, wherein, upon reception, the modulated carrier signal is demodulated.

9. A communication system as claimed in claim 6, wherein a data rate given asymmetrical transmission is approximately 9 through 200 kbits/s.

10. A communication system as claimed in claim 1, wherein the network cable is an at least five-lead, shielded network cable and includes three conductors, a zero conductor and a protective conductor, and wherein the network termination is a three-phase network termination.

11. A communication system as claimed in claim 10, wherein the first and second conductors of the three conductors form a first transmission channel and the third conductor of the three conductors and the zero conductor form a second transmission channel via which a symmetrical transmission of data respectively occurs.

12. A communication system as claimed in claim 11, wherein a carrier signal is respectively modulated with signals containing data given transmission per transmission channel, the modulated carrier signal being transmitted via the two conductors of the respective transmission channel in the form of two signals.

13. A communication system as claimed in claim 12, wherein, upon reception, a difference signal is to be demodulated which corresponds to the respective modulated carrier signal being acquired from the signals transmitted via the two conductors of the respective transmission channel.

14. A communication system as claimed in claim 10, wherein the protective conductor forms a third transmission channel via which an asymmetrical transmission of data occurs.

15. A communication system as claimed in claim 14, wherein, upon transmission, a carrier signal is modulated with signals containing data.

16. A communication system as claimed in claim 15, wherein, upon reception, the modulated carrier signal is demodulated.

17. A communication system as claimed in claim 1, wherein the means for generating signals to be transmitted includes a filter circuit, at least one transformer, and a circuit for modulation of carrier signals with signals containing data.

18. A communications system as claimed in claim 1, wherein the means for interpreting received signals includes a filter circuit, at least one transformer, and a circuit for demodulation of modulated carrier signals.

19. A communication system as claimed in claim 1, wherein the communication subscribers include at least one medical apparatus.

20. A communication system as claimed in claim 19, wherein plurality of medical apparatus are provided that form a medical work station.

* * * * *